United States Patent [19]

Messenger

[11] 3,884,302

[45] May 20, 1975

[54] WELL CEMENTING PROCESS

[75] Inventor: Joseph U. Messenger, Dallas, Tex.

[73] Assignee: Mobil Oil Corporation, New York, N.Y.

[22] Filed: May 29, 1974

[21] Appl. No.: 474,290

[52] U.S. Cl................................ 166/291; 166/292
[51] Int. Cl............................................. E21b 33/16
[58] Field of Search ........... 166/291, 292, 294, 285, 166/312, 311

[56] References Cited
UNITED STATES PATENTS

| | | | |
|---|---|---|---|
| 2,848,051 | 8/1958 | Williams | 166/291 |
| 3,291,211 | 12/1966 | Savins et al. | 166/285 |
| 3,299,952 | 1/1967 | Savins | 166/285 |
| 3,348,612 | 10/1967 | Messenger | 166/292 |
| 3,411,580 | 11/1968 | McKinney et al. | 166/312 X |
| 3,625,286 | 12/1971 | Parker | 166/291 |
| 3,688,845 | 9/1972 | Messenger | 166/291 |

*Primary Examiner*—Stephen J. Novosad
*Attorney, Agent, or Firm*—C. A. Huggett; Henry L. Ehrlich

[57] ABSTRACT

This specification discloses a method of cementing casing in a well having a drilling mud therein. An alkaline flush having a pH of at least 10 is flowed through the annular space between the casing positioned in the well and the wall of the well. Thereafter, an aqueous base preflush having a characteristic of forming a viscous film at the interface between the preflush and an alkaline solution is flowed through the annular space to displace the alkaline flush and drilling mud therefrom. Thereafter a cement slurry, itself alkaline, is flowed into the annular space to displace the preflush and is allowed to set to bond the casing to the wall of the well.

6 Claims, No Drawings

WELL CEMENTING PROCESS

BACKGROUND OF THE INVENTION

This invention relates to cementing casing in a well drilled from the surface of the earth into a subterranean formation.

Rotary drilling techniques are commonly used for drilling wells into the earth. In the rotary drilling of a well, a drilling fluid or mud is circulated between the surface of the earth and the bottom of the well. Two general types of liquid drilling muds which are commonly used are water-based drilling muds and oil-based drilling muds. Drilling muds serve many useful purposes including the removal of earth cuttings from the well, control of formation pressures, and cooling and lubrication of the drill bit used in forming the well. However, there are also certain detrimental characteristics associated with drilling muds. For example, drilling muds tend to flow from the well into exposed permeable formations with the result that mud solids are filtered out on the wall of the well and a filter cake is formed thereon. Thick filter cakes are particularly harmful in that they may impede or stop the movement of drilling tools in the well. Even thin filter cakes are detrimental in the completion of wells in that they interfere with obtaining a good cement bond between the wall of the well and the casing positioned in the well.

In the completion of wells, casing is normally lowered into the well and a cement slurry is flowed down the casing and up the annular space formed between the casing and the wall of the well. Cement slurries have been emplaced in the annular space between the casing and the wall of the well by flowing the slurries thereinto in direct contact with the mud. This procedure may result in poor cement jobs because of contamination of the cement slurry by the mud and because of failure to remove the mud and the filter cake from the wall of the well. In order to obtain improved cement jobs, various techniques, including the use of preflush solutions or washes, have been developed. There is described in U.S. Pat. No. 3,291,211 to Joseph G. Savins a method of cementing a well wherein the drilling mud in the annular space between the casing and the wellbore wall is removed by passing into a well prior to placing a cement slurry therein a liquid comprising a solvent containing a dissolved solute which imparts viscoelastic properties to the liquid. In U.S. Pat. No. 3,348,612 to Joseph U. Messenger, there is described a technique of cementing casing in a well wherein a slug of liquid having mutual solubility for oil and water is passed into a well and into the annular space formed between the wall of the well and the outer surface of the casing and is followed by a cement slurry. A slug of an organic solvent for oil and asphalt may be passed into the annular space ahead of the slug of liquid having mutual solubility for oil and water.

Another technique for cementing casing in a well is described by Joseph U. Messenger in U.S. Pat. No. 3,467,193. A preflush comprised of formation water containing dispersants is flowed through the annular space formed between casing and the wall of the well. Thereafter a spearhead of cement slurry containing a turbulence inducer and silica or diatomaceous earth particles and having a density at least as great as the drilling mud employed in drilling the well is flowed into the annular space. This is followed by a densified cement slurry and the cement slurry is allowed to set. There is described in U.S. Pat. 3,688,845 to Joseph U. Messenger a method of cementing casing in a well having an oil base drilling mud therein. A preflush solution comprised of an oil and a dispersant, which preflush solution has a lower viscosity and a lower gel strength than the drilling mud in the well, is flowed through the annular space between casing positioned in the well and the wall of the well. Thereafter, a cement slurry is flowed into the annular space and is allowed to set.

In U.S. Pat. 3,411,580 to Oscar B. McKinney et al. there is described a method of displacing drilling mud in a well having a pipe such as well casing extending longitudinally therein and forming an annulus between the pipe and the wall of the well. A preflush fluid that is comprised of water, a polysaccharide, and a crosslinking agent, such as boric acid, for the polysaccharide is prepared. The preflush fluid is circulated into contact with the drilling mud in the well and the circulation is continued to displace the drilling mud from the well. Thereafter, a cement slurry is circulated into the annulus behind the preflush fluid and maintained in a quiescent condition in the annulus until it has set to bond the pipe to the wall of the well. This preflush fluid has a characteristic of forming a viscous film at the interface with the drilling mud and at the interface with the cement slurry, which viscous film conforms to the physical configuration of the well and removes drilling fluids from enlarged sections. In a preferred method this preflush fluid is further comprised of chemicals, such as wetting agents, which preferentially water wet both the casing and the formation for better cement bonding.

SUMMARY OF THE INVENTION

This invention is directed to a method of cementing casing in a well having a drilling mud therein. An aqueous alkaline wash, having a pH of at least 10, is flowed into the annulus formed between the casing and the wall of the well. Thereafter an aqueous preflush having a characteristic of forming a viscous film upon contact with a fluid having a pH of at least 10 is flowed into the annulus. Thereafter a cement slurry is flowed into the annulus and is allowed to set and bond the casing to the wall of the well.

DESCRIPTION OF THE PREFERRED EMBODIMENTS

This invention is directed to a process for completing a well and more particularly to a process of cementing casing in a well.

In accordance with this invention there is flowed into the annulus formed between casing positioned in the well and the wall of the well a slug of an aqueous alkaline wash that has a pH of at least 10. Immediately following this aqueous alkaline wash, there is flowed into the annulus an aqueous preflush that has the characteristic of forming a viscous film or layer upon contact with an alkaline fluid having a pH of at least 10. Immediately following this aqueous preflush there is flowed into the annulus a cement slurry and the cement slurry is maintained in the annulus and allowed to set and bond the casing to the wall of the well. The aqueous alkaline wash which is flowed into the annulus dilutes and washes the drilling mud from the wall of the casing and the wall of the well and displaces the drilling mud upwardly in the annulus. The aqueous preflush is flowed into the annulus in contact with the aqueous alkaline wash and a viscous film or layer is formed at the interface between the aqueous alkaline wash and the aqueous preflush. This viscous film aids in displacing the aqueous alkaline wash upwardly in the annulus to further displace and clean the annulus, wall of the casing, and wall of the well. The cement slurry is flowed into the annulus in contact with the aqueous preflush. The cement slurry has a sufficiently high pH that a viscous film is formed at the interface between the aqueous preflush and cement slurry. This viscous film assists in sweeping the aqueous preflush and aqueous alkaline wash upwardly in the annulus and in cleaning the annulus. The cement slurry is maintained to the annulus and allowed to set and bond the casing to the wall of the well.

In accordance with an embodiment of this invention, the viscosity and flow rate of the aqueous alkaline wash, aqueous preflush, and cement slurry are provided and controlled such that the aqueous alkaline wash flows in turbulent flow in the annulus while the aqueous preflush and cement slurry flow in plug flow. For example, in a well having a 2⅝ inch annulus, as would be formed by positioning a 9⅝ inch casing in a 12¼ inch hole, the aqueous alkaline wash may be flowed in turbulent flow and the aqueous preflush and cement slurry flowed in plug flow by providing an aqueous alkaline wash having a viscosity no greater than about 2 centipoises (cps), an aqueous preflush having a viscosity of at least 16 cps, and a cement slurry having a Reynolds number of about 300 or less, and flowing the aqueous alkaline wash, aqueous preflush, and cement slurry in the annulus at a rate within the range of 45 to 90 feet per minute. For different sized annuli, other viscosities and flow rates may be selected employing techniques available in the well cementing technology to provide for turbulent flow of the aqueous alkaline wash and plug flow of the aqueous preflush and cement slurry. Flowing the aqueous alkaline wash in turbulent flow in the annulus aids in scrubbing and scouring the drilling mud and filter cake from the wall of the casing and wall of the well while concomitantly flowing the aqueous preflush and cement slurry in plug flow in the annulus allows the viscous films that form at the interfaces between the aqueous preflush and the aqueous alkaline wash and cement slurry to be effective in cleaning and displacing the drilling mud from the annulus and the wall of the casing and wall of the well. Thus, the cement may be flowed into the annulus with a minimum amount of contamination by the drilling mud and the drilling mud and filter cake more completely removed from the wall of the casing and wall of the well thereby enabling the cement to better bond the casing to the wall of the well.

This invention is also applicable for use in a well having an oil base drilling mud therein. In carrying out this invention wherein an oil base mud is present in the well, it is desirable to first flow a light oil wash, such as a diesel oil wash, into the annulus to dilute and displace the oil base drilling mud up the annulus. An aqueous alkaline wash is next flowed into the annulus to displace the light oil wash up the annulus and to provide an alkaline environment in the well. Next an aqueous preflush having a characteristic of forming a viscous film upon contact with a fluid having a pH of at least 10 is flowed into the annulus in contact with the aqueous alkaline wash and because of the alkaline environment provided in the well by the aqueous alkaline wash, a viscous film is formed at the leading interface of the aqueous preflush which viscous film aids in effectively cleaning the annulus. Thereafter a cement slurry is flowed into the well and allowed to set and bond the casing to the wall of the well.

The aqueous alkaline wash may be formed by adding an alkali, such as sodium hydroxide or sodium carbonate, to an aqueous fluid in an amount sufficient to provide a pH of the aqueous alkaline wash of at least 10. As an example, the aqueous alkaline wash may be formed by dissolving about 25 pounds of sodium hydroxide in 1,000 gallons of water or 100 pounds of sodium carbonate in 1,000 gallons of water. The volume of aqueous alkaline wash to be employed in carrying out this invention will normally vary between about 10 to 50 barrels.

An example of an aqueous preflush having the characteristic of forming a viscous film upon contact with a fluid having a pH of at least 10 which may be employed in carrying out this invention is the preflush described in the before-mentioned U.S. Pat. No. 3,411,580 to Oscar B. McKinney et al. Reference is made to U.S. Pat. No. 3,411,580 for a detailed description of an aqueous preflush that has the characteristic of forming a viscous gel upon contact with a fluid having a pH of at least 10. This preflush is comprised of water, a polysaccharide, and a cross-linking agent, such as boric acid, for the polysaccharide. The preflush may also include a flocculating agent for clay contained in a drilling mud, a wetting agent, a low fluid-loss agent, or a combination of any two or all three of such agents. The volume of the aqueous preflush normally used in carrying out this invention will normally vary between 10 and 50 barrels.

I claim:

1. A method of cementing casing in a well having a drilling mud therein, comprising the steps of:
    a. flowing an aqueous alkaline wash having a pH of at least 10 into the annulus formed between said casing and the wall of the well;
    b. flowing an aqueous preflush into said annulus and in contact with said aqueous alkaline wash to displace said aqueous alkaline wash up said annulus, said aqueous preflush having a characteristic of forming a viscous film upon contact with a fluid having a pH of at least 10;
    c. flowing a cement slurry into said annulus and in contact with said aqueous preflush to displace said aqueous preflush up said annulus; and
    d. allowing said cement slurry to set in said annulus and bond said casing to said wall of the well.

2. The method of claim 1 wherein said aqueous alkaline wash is comprised of an aqueous solution of an alkali selected from the group consisting of sodium hydroxide or sodium carbonate.

3. The method of claim 2 wherein said aqueous alkaline wash is flowed into said well in an amount of at least 5 barrels.

4. The method of claim 2 wherein said aqueous preflush is comprised of water, a polysaccharide, and a cross-linking agent for the polysaccharide.

5. In a method of cementing casing in a well penetrating a subterranean formation wherein a cement slurry is flowed into the annulus formed intermediate the casing and the wall of the well and is allowed to set and bond the casing to the wall of the well, said well having a drilling mud therein, the improvement comprising:

a. flowing in turbulent flow into said annulus an aqueous alkaline wash having a pH of at least 10;

b. flowing in plug flow into said annulus and in contact with said aqueous alkaline wash an aqueous preflush that has a characteristic of forming a viscous film upon contact with a fluid having a pH of at least 10; and c. flowing in plug flow into said annulus and in contact with said aqueous preflush and cement slurry.

6. A method of cementing casing in a well having an oil base drilling mud therein, comprising the steps of:

a. flowing a light oil wash into the annulus formed between said casing and the wall of said well;

b. flowing an aqueous alkaline wash having a pH of at least 10 into said annulus;

c. flowing an aqueous preflush into said annulus and in contact with said aqueous alkaline wash to displace said aqueous alkaline wash up said annulus, said aqueous preflush having a characteristic of forming a viscous film upon contact with a fluid having a pH of at least 10;

d. flowing a cement slurry into said annulus in contact with said aqueous preflush to displace said aqueous preflush up said annulus; and e. allowing said cement slurry to set in said annulus and bond said casing to said wall of the well.

* * * * *